United States Patent [19]

Rodi et al.

[11] Patent Number: 4,998,472
[45] Date of Patent: Mar. 12, 1991

[54] DEVICE FOR CONTROLLING A PRINTING MACHINE

[75] Inventors: Anton Rodi, Leimen; Dieter Hauck, Eberbach; Michael Lehnert, Heidelberg; Manfred Jurkewitz, Wiesloch, all of Fed. Rep. of Germany

[73] Assignee: Heidelberger Druckmaschinen AG, Heidelberg, Fed. Rep. of Germany

[21] Appl. No.: 560,234

[22] Filed: Jul. 23, 1990

Related U.S. Application Data

[63] Continuation of Ser. No. 202,738, Jun. 3, 1988, abandoned.

[30] Foreign Application Priority Data

Jun. 3, 1987 [DE] Fed. Rep. of Germany ....... 3718594

[51] Int. Cl.$^5$ ............................................. B41F 33/16
[52] U.S. Cl. ..................................... 101/216; 101/365; 101/483
[58] Field of Search ............... 101/DIG. 47, 365, 212, 101/216, 483, 350, 494; 341/23; 340/711; 400/255

[56] References Cited

U.S. PATENT DOCUMENTS 4,185,282 1/1980 Pick ................................. 341/23 X
4,709,635 12/1987 Kubert et al. .................. 101/365 X

FOREIGN PATENT DOCUMENTS 99536 6/1984 Japan .................................. 400/255
2008286 5/1979 United Kingdom .

OTHER PUBLICATIONS

Publication of "Heidelberger Druckmaschinen AG. of Heidelberg, Federal Republic of Germany, Heidelberger (Nachrichten) News, 3/40".

Primary Examiner—Clifford D. Crowder
Attorney, Agent, or Firm—Herbert L. Lerner; Laurence A. Greenberg

[57] ABSTRACT

A device for controlling a machine having controls for inputting commands, and display elements for displaying a status includes at least two groups of the controls including a first group of controls for selecting an assignment of a second group of controls to given machine components to be controlled, the display elements serving to display the assignment.

13 Claims, 8 Drawing Sheets

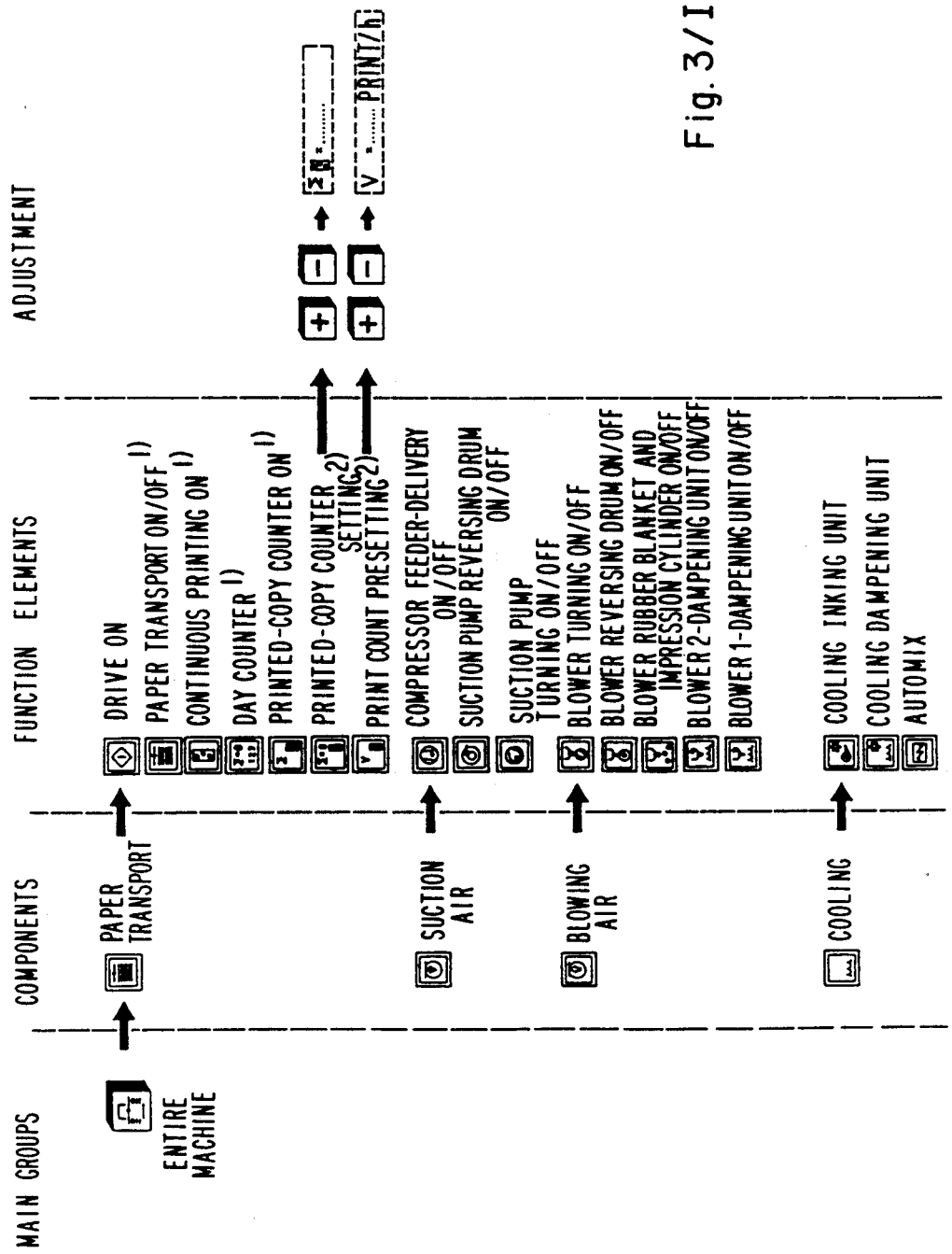
Fig. 3/I

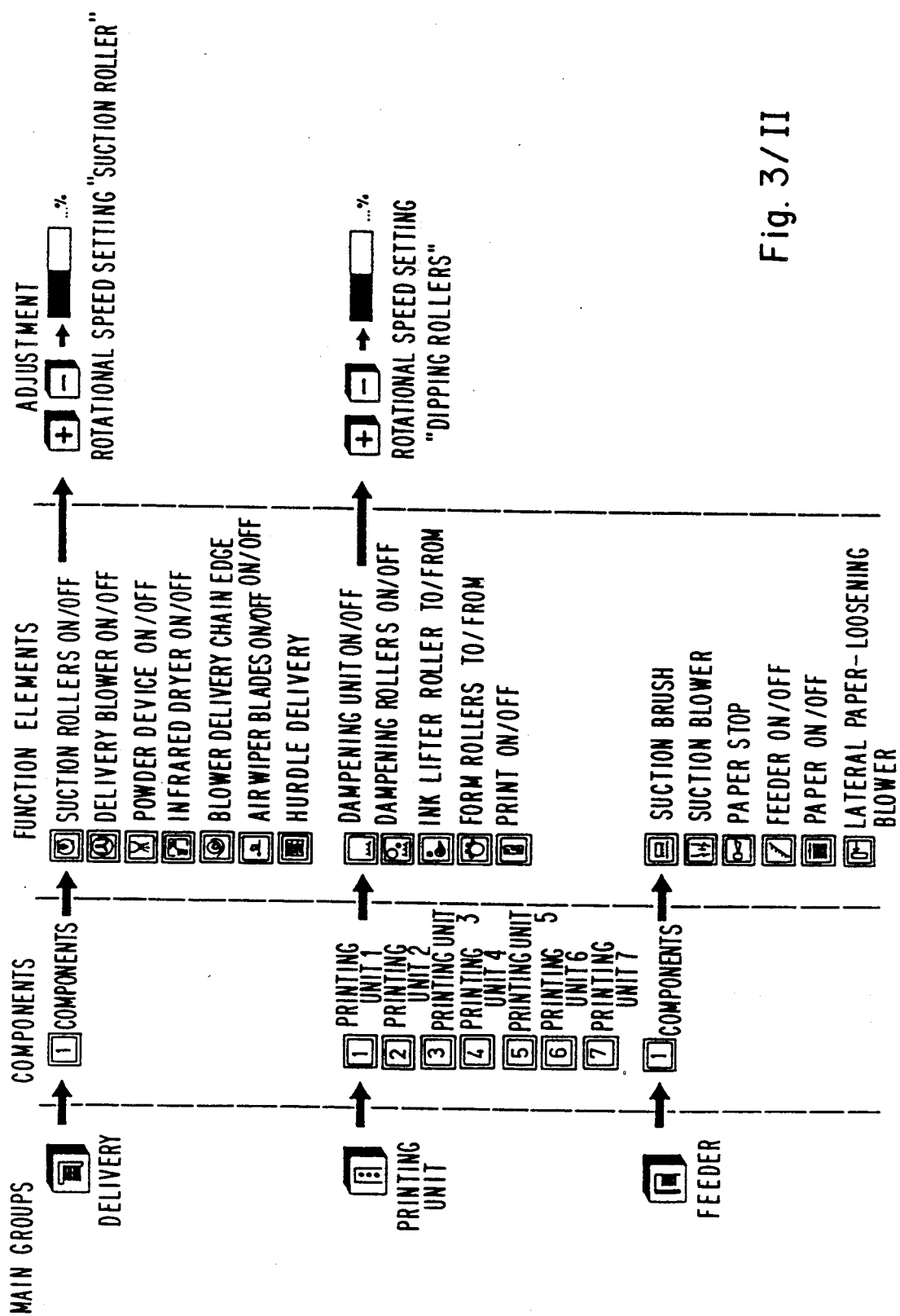
Fig. 3/II

DEVICE FOR CONTROLLING A PRINTING MACHINE

This application is a continuation of application Ser. No. 202,738, filed June 3, 1988, now abandoned.

The invention relates to a device for controlling a machine having controls for inputting commands, and display elements for displaying a status and, for example, for controlling a printing machine with a control desk.

Such a device has become known heretofore, for example, from a publication of HEIDELBERGER DRUCKMASCHINEN AG. of Heidelberg, Federal Republic of Germany, namely "Heidelberger Nachrichten 3/40". A system presented therein under the name CPC 1 contains a control desk for controlling inking in a printing machine, wherein ink-metering elements are adjusted by means of controls. The positions of these ink-metering elements are displayed on an LED display. In a printing machine, as well as in other types of machines, such as machine tools, for example, there are, however, a multiplicity of different machine components that have to be set or adjusted prior to startup of the machine or also during operation of the machine. For example, there are a number of actuators that operate a specific element of a component. Heretofore, it has been customary, for setting and adjusting, respectively, and for displaying the setting and adjustment, respectively, to provide a control desk in which a multiplicity of keys were provided and in which each key was capable of executing a specific control command It is apparent that, precisely in the case of very complex machines with a multiplicity of printing units and sets of equipment, such control desks become very large and unmanageable, and thereby impede operator control.

It is an object of the invention, therefore, to provide a device for controlling a machine which avoids the aforedescribed disadvantages and thus considerably facilitates the operation of a machine as well as the monitoring thereof.

With the foregoing and other objects in view, there is provided, in accordance with the invention, a device for controlling a machine having controls for inputting commands, and display elements for displaying a status, comprising at least two groups of the controls including a first group of controls for selecting an assignment of a second group of controls to given machine components to be controlled, the display elements serving to display the assignment.

An essential advantage of this construction of an input and display device is the small number of keys and input elements, which are capable cf multiple assignments, which are effected, depending upon selection by the first group of controls based upon a display. Furthermore, the display is able directly to represent whether a specific function of the machine is switched on or off and whether it has a specific value, respectively. Thus, for example, the display also offers the possibility of representing an amount of adjustment travel, for example, graphically and/or numerically.

In accordance with another feature of the invention, it is proposed that a third group of controls be provided especially for switching on and switching off or for adjusting machine functions. This third group of controls, in conjunction with the first and second groups of controls, thus results in the following control structure: The first group of controls is used for selecting main groups or main functions of the machine; the second group of controls is used for selecting components of these machine elements; and the third group of controls is used for controlling functions in the components and for changing settings or values, respectively.

In accordance with a further feature of the device, the first group of controls has a fixed assignment to specific main groups and main functions, respectively, of the machine. This means that, for example, a main group of the machine can be selected directly by a single command i.e. actuating or depressing one key, with the result that rapid access to a specific main group or main function is possible.

In accordance with an added feature of the invention, a function input, initiated by command, is executed immediately or is merely preselected and is executed only when, for example, a further command is given or when the machine is in a specific operating condition. This so-called preselection of functions is useful, for example, if the machine is set before startup and this prior setting is to be performed only when the machine has begun to operate.

In accordance with an additional feature of the invention, a display is provided with which the assignment of the controls is displayed graphically. Thus, the display is language-independent. The symbols are readily understandable and rule out the possibility of incorrect operation due to linguistic misunderstandings. It is also possible to display an additional picture showing the entire component of the machine or also the entire machine, such a display permitting the operator to assign the commands to be executed to the respective component or machine. The display of these components or of the machine is controlled by the selection of controls, which means, for example, that when a key of the first group of controls is depressed, this selected main component is displayed whereas, after a key of the second group of controls has been depressed, the then selected component is displayed as an overall picture.

A further advantage resulting from a further development of the invention is that, even if the display fails, operation of the machine remains possible, because the key assignment possibilities are fixed and the assignment of the keys is defined by the depression of specific keys, this assignment being ascertainable either from knowledge of the assignment diagram or from additional aids, such as templates or the like, thus permitting operation of the machine.

Certain processes may take place in a machine automatically without external control. For this purpose, in accordance with yet another feature of the invention, additional controls are disposed on the control device for triggering these processes.

In accordance with yet a further feature of the invention, more than one component is displayed, so that an operator has the possibility of simultaneously monitoring the set functions of more than one component.

In accordance with yet an added feature of the invention, not only are these functions monitored, but also switching or adjusting commands are applied simultaneously to more than one component.

If the device is used in a printing machine, it is particularly advantageous for the second group of controls or also a group of controls connected in parallel with the second group to be assigned to the individual printing units of the printing machine. Each printing unit can consequently be selected individually as a component or also as a whole.

In accordance with another feature of the invention, the display of the assignment of keys to specific components of the machine is effected in such a manner that representation of the groups of controls is arranged on a display and on outside edges of a display, respectively, and the region of the display adjoining the respective control and key shows the respective function or operating mode and assignment, respectively, of the control.

In accordance with an added feature of the invention, the display is provided simultaneously for service monitoring i.e. for showing the correct operation of the components or of further functions, in order to facilitate servicing of the machine.

If a printing machine is provided with the device according to the invention, it is advantageous for the device to be positioned in a central location in the direct vicinity of the printing machine. In addition to this centrally disposed device, each printing unit or the paper delivery and the paper feed, respectively, may advantageously be provided with a control desk or with a display with which operation or monitoring can be effected to the extent that this is required by the operator for the respective component. For example, it is advantageous to provide the paper feed of a sheet-fed printing machine i.e. the sheet feeder, with a display by means of which faulty sheets or other malfunctions as well as the printing speed can be displayed. Furthermore, there is also the possibility at these operating stations of changing the printing speed and, for example, of effecting-brief over or underdampening in offset printing operations or other control actions.

As is generally known, it is customary to provide a printing machine with an ink and/or register-control desk as a unit separate from the printing machine. The control device according to the invention may be joined with this unit, the control apparatus being used to perform all control actions on the printing machine that do not effect control of inking and register, respectively.

Furthermore, there is also the possibility of performing control actions on both devices. In accordance with a concomitant feature of the invention, the control actions performed on one of the devices is applied to the other device. This makes it possible to avoid overlaps in operation and duplication of operations, respectively.

It is advantageous also to transmit such control actions to the central device, so that these control actions can be displayed there.

Other features which are considered as characteristic for the invention are set forth in the appended claims. Although the invention is illustrated and described herein as embodied in a device for controlling a machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
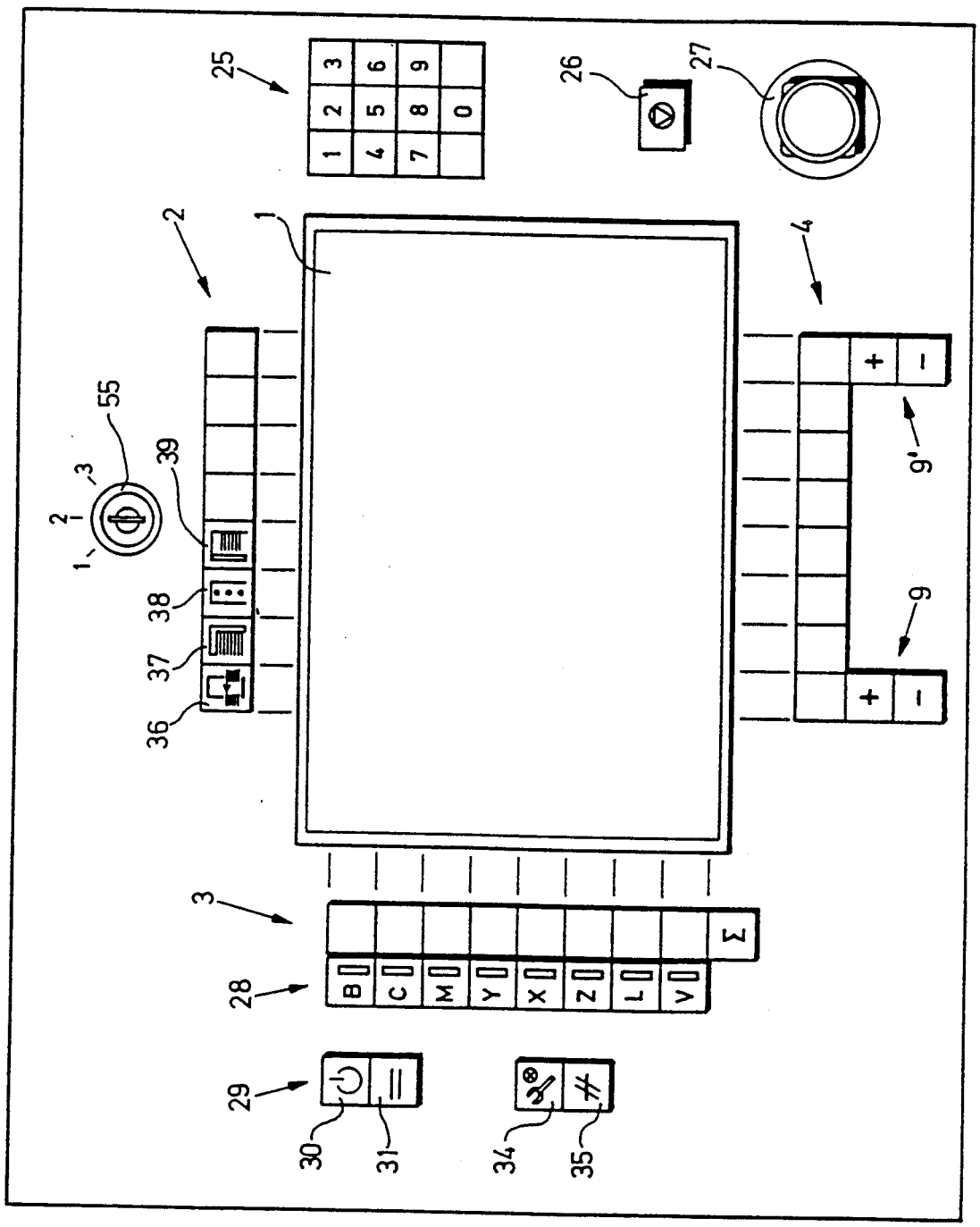
FIG. 2 is a diagrammatic view of a display keyboard showing the construction of a control apparatus for a sheet-fed printing press specifically.
Figure 3A:
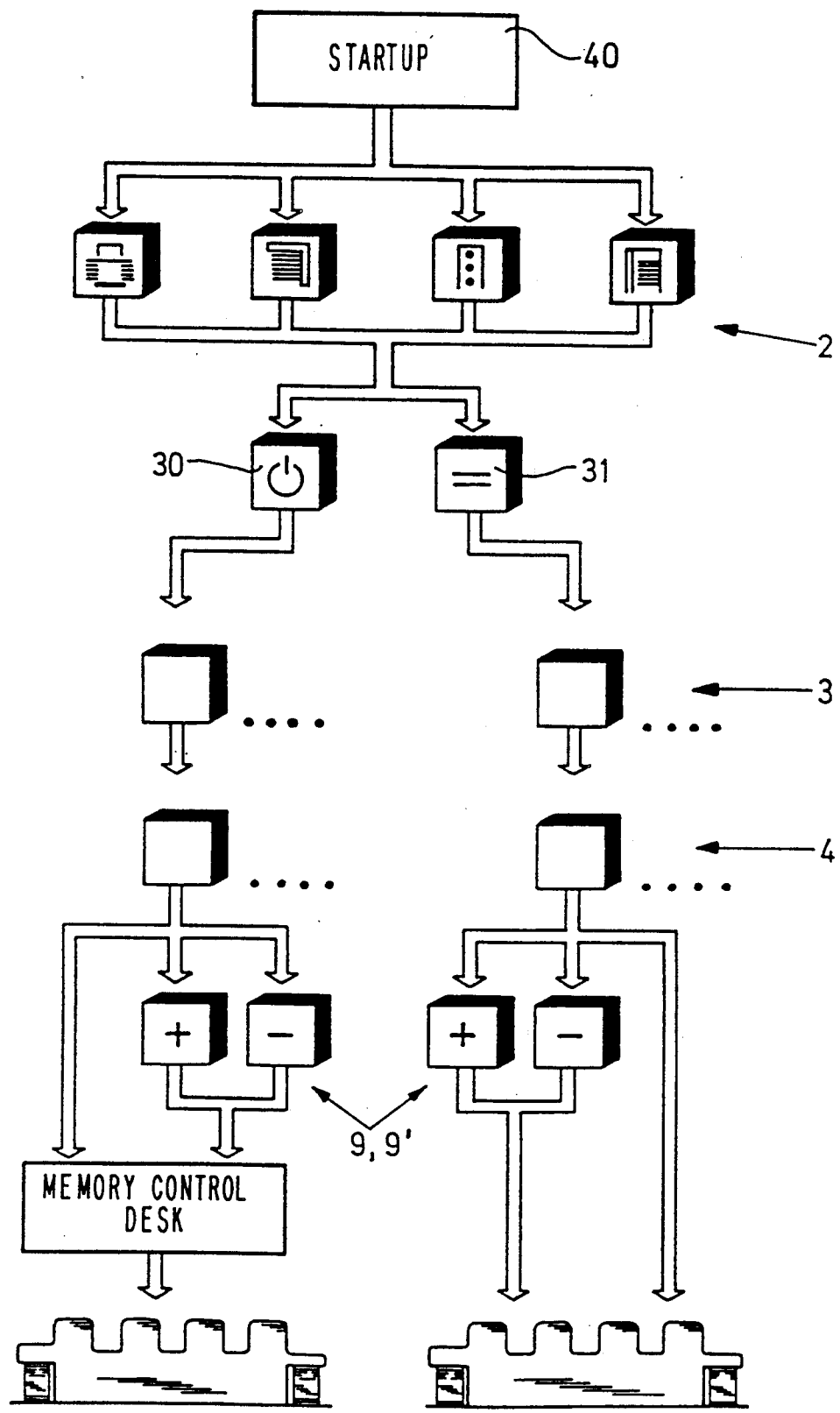
Figure 4:
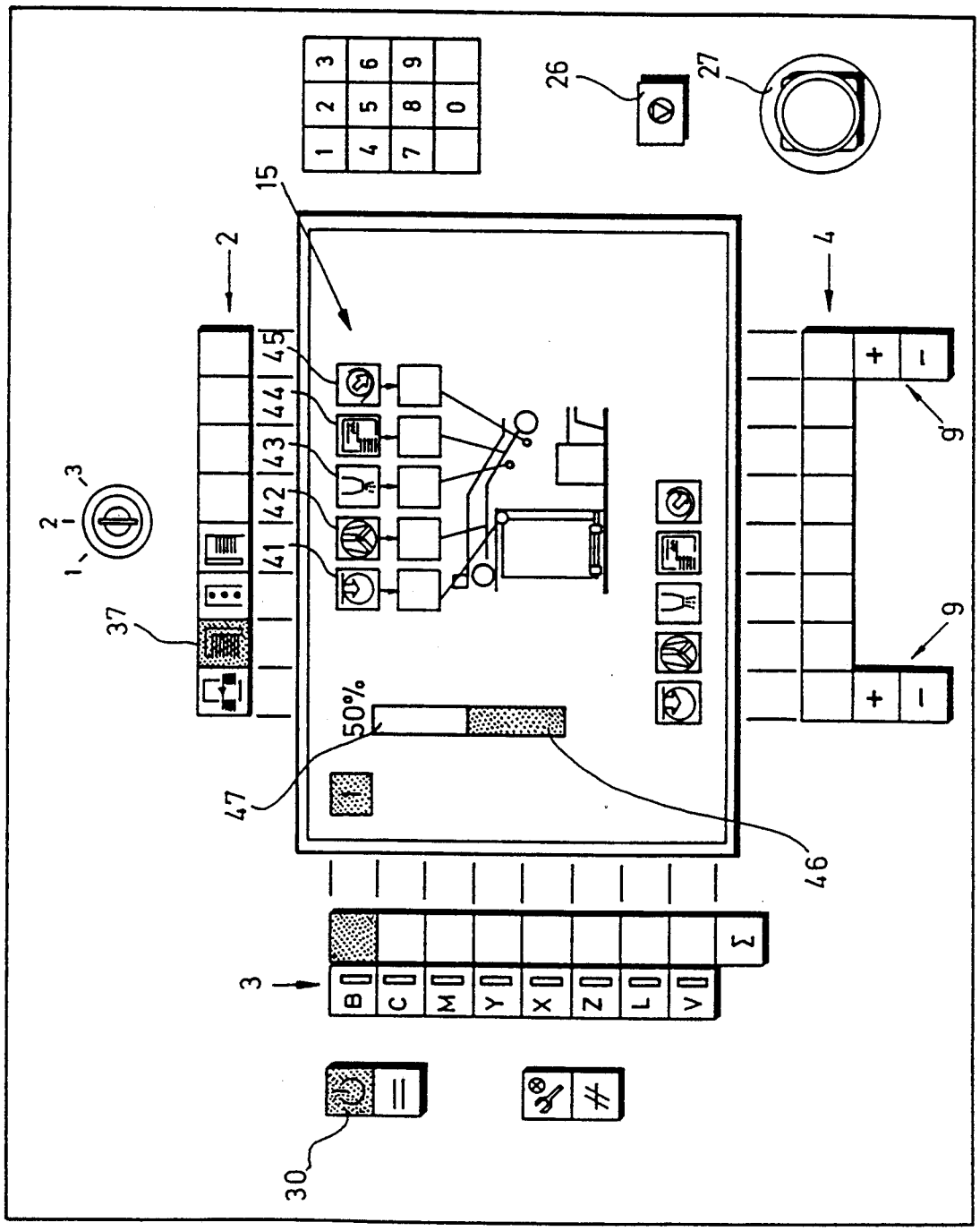
Figure 5:
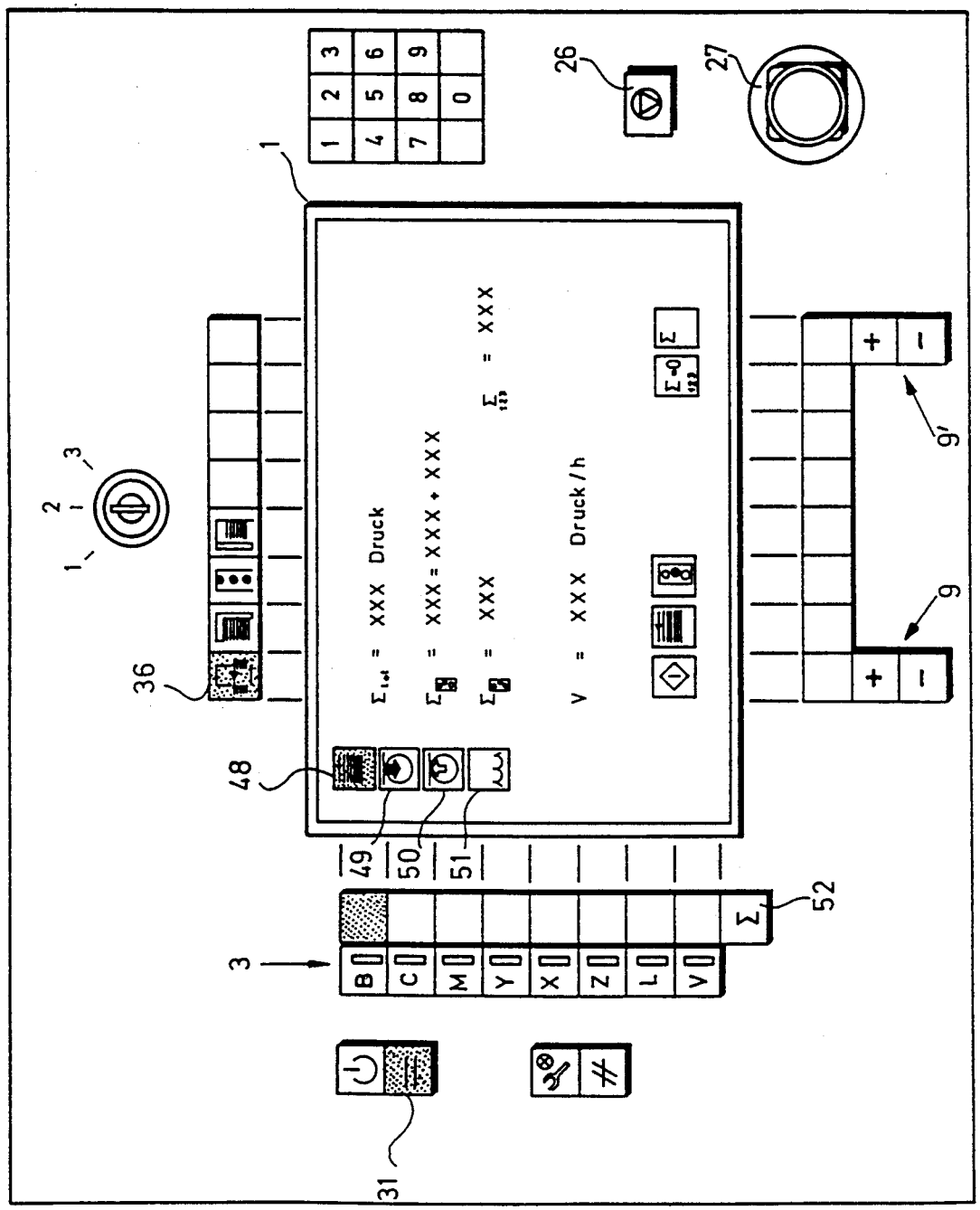
Figure 6:
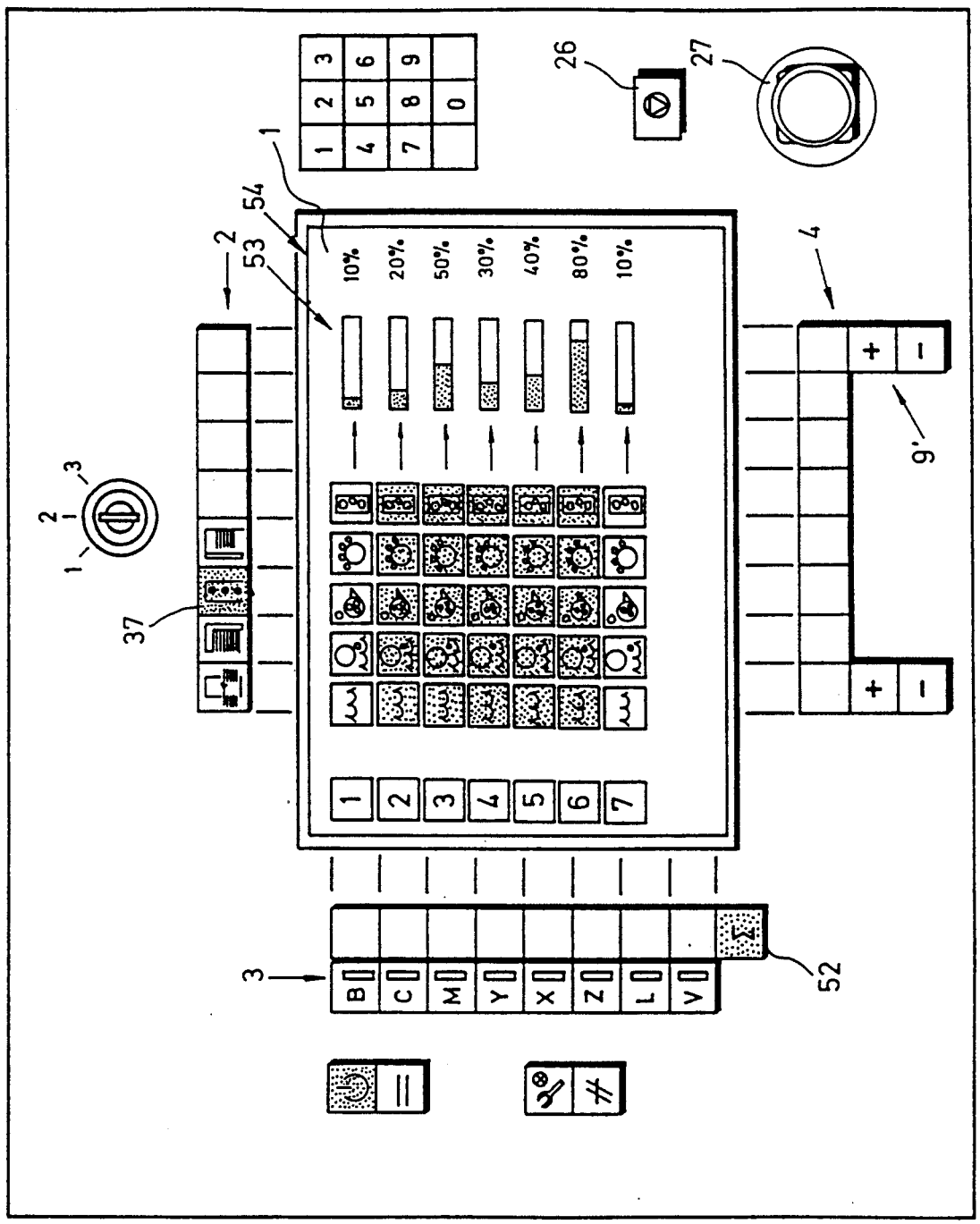

FIGS. 3/I and 3/II constitute a listing of the various operations possible with the display keyboard of the control apparatus shown in FIG. 2;

FIG. 3a is a flow chart for operator control of the control apparatus and display keyboard therefor shown in FIG. 2;

FIG. 4 is a view of the display keyboard like that of FIG. 2 which has been set for displaying an example of the control of the delivery of a sheet-fed printing press;

FIG. 5 is a view of the display keyboard like that of FIG. 2 which has been set for displaying an example of the transport of the paper in a sheet-fed printing press;

FIG. 6 is a view of the display keyboard like that of FIG. 2 which has been set for displaying an example of all the printing units of a sheet-fed printing press.

Figure 1:
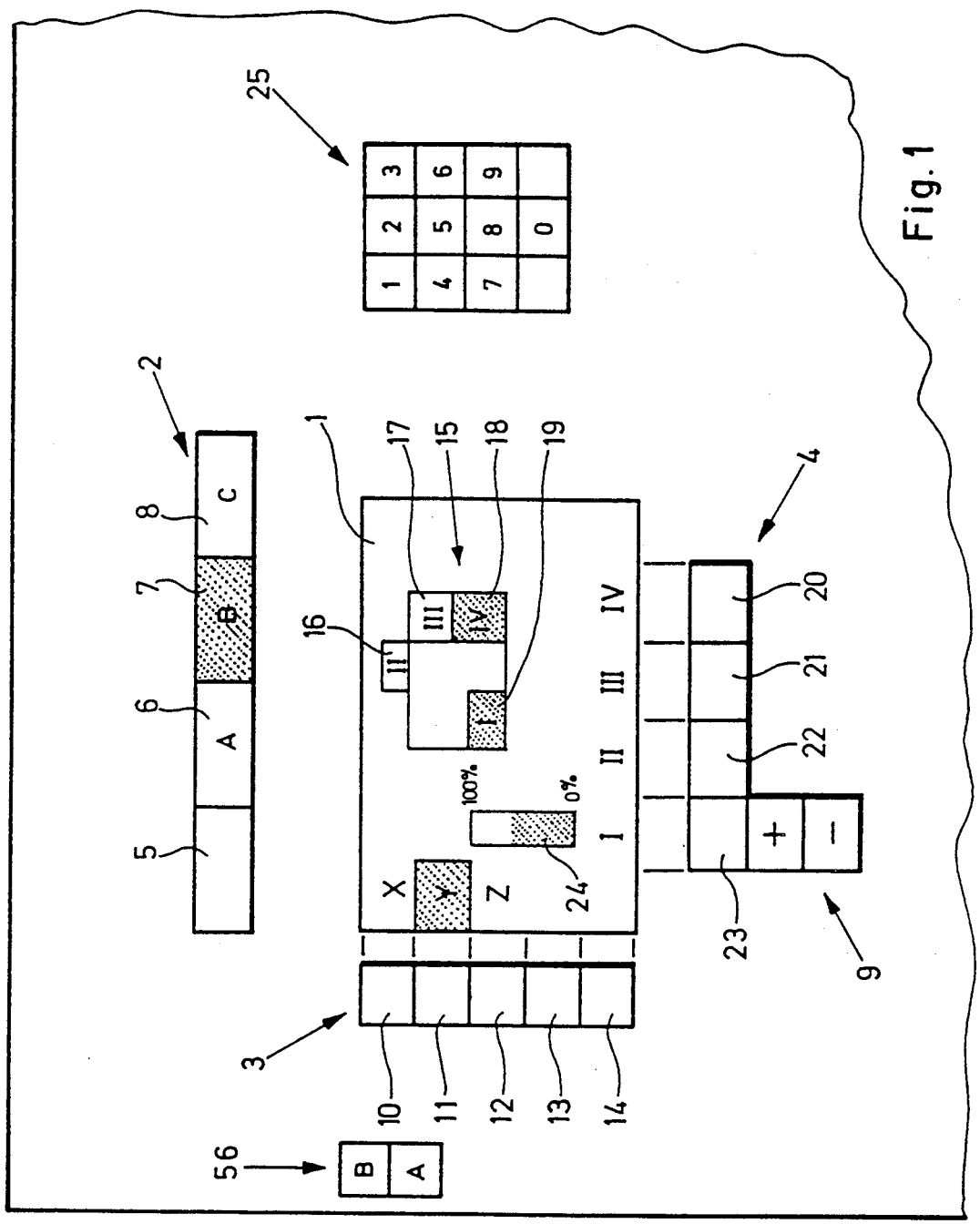
FIG. 1 is a diagrammatic view of a display keyboard showing the construction of a control apparatus for a machine in general.

Referring now to the drawing and, first, particularly to FIG. 1 thereof, there is shown a display keyboard of a control and display device arranged, for example, on a control desk of a machine. Provided for indication or display is a video display monitor 1, and a multiplicity of controls i.e. control keys, which are arranged in groups, with a first group of the controls 2 disposed above the display 1, a second group of controls 3 disposed at a side of the display 1, and a third group of controls 4 disposed below the display 1.

The group of controls 2 is used for selecting various main groups A, B, C of the machine, respectively identified by reference numerals 6, 7, 8 or for selecting the machine as a whole 5. With the controls 3, various components of the respectively selected main group or of the machine as a whole may be selected, while with the controls 4, control operations, such as the switching on and switching off of the selected component may be performed, or various functions of the selected component may be controlled. An input panel 25 is disposed to the right-hand side of the display 1 for the numerical inputting of setting data, production-number data or the like. Display-mode keys 56 serve for selecting a display mode in which inputs are to be made. In a first input mode, the inputs are loaded directly into the machine while, in a second input mode, the inputs are initially stored and are then loaded into the machine at a later time. In addition, a key 9 affords the possibility of making an adjustment to a specific setting on a specific component. With reference to an example, the control of a specific and random component, respectively, is intended to illustrate the operating principle of the control apparatus.

Initially, the controls 2 are used for selecting the main group in which a change is to be made. This is done by pressing the control 7, for example. The controls may be in the form of keys, it being possible also, of course, for the controls to be in the form of non-contacting or contactless sensors or the like. After the control 7 has been actuated i.e. the key 7 has been pressed, the controls 3 are assigned via the display 1 to specific components of the selected main group, i.e. via the key 10 it is possible to select a component X, via the key 11 a component Y, and via the key 12 a component Z of the selected main groups A, B or C. In this example, the keys 13 and 14 are not assigned to any components.

Selection of the component Y, which results from pressing the key 11, causes this component Y to appear in the form of a diagrammatic representation 15 on the display 1. At the same time, in this diagrammatic representation Y, motors, actuators or the like I, II, III and IV in the form of so-called function elements are graphically illustrated. Simultaneously, the controls 4 are assigned to these function elements I, II, III and IV, this being accomplished by lighting up the corresponding symbols of the locations assigned to the controls 4 in the display 1. It is then possible, with the controls 4, for example with the key 20, to switch on the function element 18 (IV). The operating condition "on" is displayed by the lighting-up of the function element 18 (IV). Those function elements which were already on are likewise displayed, by the lighting-up of the represented function element, for example, the function element 19 (I).

Furthermore, by means of the key 9, which is in the form of a plus-minus key, it is possible to adjust the value of a function element. In the example shown, the function element I (19), which is indicated above the key 9 and the function key 23, respectively, can be set or adjusted. The amount of the setting is made optically perceptible via a graphic representation by a value indicator 24, which, for example, indicates a rotational speed of the function element I which contains a motor, the amount of the indicated rotational speed being shown in relation to a maximum speed or in relation to a nominal speed.

Of course, it is possible to assign a plus-minus key 9 to each function key 20 to 23. This is necessary if a setting to specific values is required for several or all of the function elements. If, however, merely switching a function element on or off is required, then one single function key will be perfectly adequate.

The control and indication desk for controlling a sheet-fed printing machine is shown in FIG. 2 and is described in greater detail hereinbelow. Once again, the groups of controls 2, 3 and 4 as well as the display 1 and keys 9, 9' are provided. Furthermore, this device also includes an input panel 25 for numerical inputs, a key for stopping the machine, an emergency shut-off key, two further groups of keys 28 and 29 and a switch 55 controlled by a lock-type key.

The group of keys 28 serves for selecting the individual printing units of the printing machine and is identified, respectively, by the printing colors and by other characteristics, respectively, of the individual printing units. The group of keys 29 contains a preselection key 30, an actual-value key 31, a service key 34 and a malfunction key 35. It is possible with the preselection key 30 only to preselect certain function inputs, these preselected functions to be activated only when the machine starts up or when the machine is in a specific operating condition. If, on the other hand, the actual-value key 31 is actuated, then the inputting of the respective function is followed immediately by its being loaded into the machine i.e. the inputted command is immediately executed. By depressing the service key 34, it is possible to check the switching states of the individual components.

By means of the controls 2, the main groups of the printing machine can be selected: A key 36 identifies the machine as a whole. After this key 36 has been depressed, it is possible for the operation of the components of the entire machine, such as paper travel, suction air, blowing air, cooling device and cooling system, respectively, to be controlled. A key 37 is used for selecting the sheet delivery as a main group, with a key 38 being used to select the printing units as a machine element, and a key 39 being used to select the feeder as a machine element.

In order to explain the operation and sequence of operating steps, respectively, for controlling the sheet-fed printing machine, FIGS. 3/I and 3/II provide a list of the possible operations. Listed in a first column are the main groups and machine elements, respectively, as identified on the controls 2 in FIG. 2. When one of the controls 2 is actuated, the controls 3 are assigned to the components shown in column 2. The selection of one of these components, by actuating one of the controls 3, results in an assignment of the function keys (controls 4) to the function elements shown in column 3 in FIG. 3. With regard to the function elements "set production-run counter", "set number of prints" as well as "suction roller" and "dampening", it is also possible to effect an adjustment to a specified value by means of keys 9, 9'. Thus, by depressing the key 9', it is possible to set the function "set production-run counter" to a specified number of copies which is then correspondingly executed by the machine. Likewise, a specified printing speed can be set by means of the key 9. With regard to the function element "suction roller", button 9 is used for setting the rotational speed of the suction roller. With regard to the function element "dampening", the key 9 is used for setting the rotational speed of the fountain or dipping roller in the dampening unit.

The flow chart shown in FIG. 3a is intended to illustrate the scheme of operations at the control device and the control desk, respectively. After the control desk has been set into operation i.e. after startup 40, the controls 2 are used for selecting one of the main groups or the machine as a whole. After this selection, the key 30 or 31 is depressed to give the instruction to transmit the following function input directly to the machine (actual-value key 31) or first to store the following function-value input and then to execute this function setting or adjustment at a specified time, for example, when the machine starts up. This provisional storage requires that the preselection key 30 be depressed. After this action has been performed, a component assigned to the controls 3, which are listed in column 2 in FIGS. 3/I and 3/II, is selected and/or an adjustment is made via keys 9 and 9'. If the actual-value key 31 has been depressed, the executed functions are loaded immediately into the printing machine; if the preselection key 30 has been depressed, the executed functions are loaded into a memory in the control desk for intermediate storage and are transmitted to the printing machine only after certain criteria have been met.

In FIG. 4, there is shown an example for controlling the delivery of a sheet-fed printing machine. For performing the functions at the delivery, it is necessary first of all to depress the key 37 at the controls 2. Thereupon, the uppermost key of the controls 3 is thereby assigned to the numeral 1, which means that the delivery contains only one single group of components. This group of components is displayed in a schematic representation 15. This schematic representation contains a representation of the delivery and, disposed thereabove, the function elements: a suction roller 41, a delivery blower 42, a powder unit 43, an IR drier 44, and a delivery chain wheel blower 45. By depressing the preselection key 30, a determination is made that the following depression or actuation of one of the function keys of the controls 4 is first of all to be stored. By means of the controls 4, it is now possible to switch one of the function elements on and off, respectively. Switching-on of the function elements is signalled by the lighting-up of the appropriate function element in the schematic representation 15. Furthermore, it is possible to make an adjustment to the rotational speed of the suction roller 41 via the key 9. The preset speed is indicated by means of a graphic display 46 and by means of an additional numeric display 47.

FIG. 5 shows an example for displaying the paper travelling in a sheet-fed printing machine. In this case, the selection of the key 36 i.e. the machine as a whole, effects the assignment of the controls 3 by the symbols shown in the display 1: paper travel 48, suction air 49, blowing air 50, cooling 51.

By actuating the actual-value key 31 and then the key 52 which is assigned to the paper travel 48, the display 1 shows in alphanumeric representation the data required for the travel or running of the paper. Thus, the display shows the sum total ($\Sigma_{tot}$), the total prints produced by the printing machine, the display "sum of the printing units" ($\Sigma_{\text{D}}$), the prints to be produced per production run, the display (V), the speed of the machine in prints per hour, as well as the display sum ($\Sigma_{1, 2, 3}$), the daily output in number of prints. By means of the controls 4, the assignments of which are specified in the display 1 by the graphic symbols located above the controls, it is possible for the production-run counter to be set and, via the key 9, for the speed of the machine to be preset.

FIG. 6 shows, in an example, the display of all printing units of a sheet-fed printing machine. By depressing the key 37 of the controls 2, the controls 3 are assigned to the printing units 1 to 7 displaying the numerals 1 to 7 in the display 1. It is then possible for the preselection key 30 or the actual-value key 31 to be actuated. To display all of the printing units, a total key 52 is then pressed, whereupon all function elements of the individual printing units appear in the display 1, with the lighting-up of the function elements of printing units 2 to 6 indicating that these are on. By actuating one of the function keys of the controls 4, all of the function elements assigned to these function keys are switched on in this total display. Via the key 9', it is possible to change the speed settings of the dampening unit i.e. the settings of the fountain or dipping rollers which are shown graphically and alphanumerically at 53 and 54, respectively. Once again, the change for all of the printing units occurs simultaneously and uniformly.

Of course, it is also possible to set and operate, respectively, a single printing unit within the total display. For this purpose, the key of the controls 3 assigned to the respective printing unit is actuated. Only this printing unit and the function elements of this printing unit, respectively, are indicated thereby, and it is then possible to make an adjustment only for this printing unit. This printing unit can also be shown individually i.e. separately. This possibility of representing a single printing unit out of a total presentation may be regarded as a fine mode of indication or display and permits precise information to be provided on a specific, selected printing unit, after rather coarse information or data has been obtained initially on all of the printing units.

In addition to such a control desk, which permits central control of a printing machine, there is also the possibility of providing decentralized control devices and display devices, respectively, at specific locations of the printing machine. Such a location, for example, is the feeder or the delivery, as well. Displays are located thereat which show the speed of the printing machine, the correct running or travel of the sheets and the like; also located thereat are controls which enable a machine stop, an emergency shut-off, a printing start, speed control, and switching paper travel on and off. Also provided are various annunciating or signalling devices for indicating malfunctions. Furthermore, it is advantageous to provide each printing unit with a control station with which the clamping of a printing plate can be controlled or with which it is also possible to move the machine forwards or backwards with short pulses or at creep speed.

When a function element is switched on at one of the decentralized control stations, this switching operation is applied, of course, also to the central control desk, with the result that the current status of the machine is always indicated at the control desk.

The foregoing is a description corresponding in substance to German Application P 37 18 594.2, dated June 3, 1987, the International priority of which is being claimed for the instant application, and which is hereby made part of this application. Any material discrepancies between the foregoing specification and the aforementioned corresponding German application are to be resolved in favor of the latter.

We claim:

1. Device for controlling substantially all of the functions of a printing machine having controls for inputting commands, and a display device for displaying a status, comprising at least two groups of the controls including a first group of controls having a fixed assignment to freely selective units of the printing machine, a second group of controls selectively assigned to controlling components of a respectively selected unit of said selective units of the printing machine, a third group of controls for inputting at least one set of commands selected from the group consisting of switching commands and adjusting commands for triggering a function in said controlling components of said respectively selected unit of the printing machine, the display device having means for displaying in graphic symbols said selective assignment of said second group of controls to at least one of given components and functions of the printing machine.

2. Device according to claim 1, including further controls for determining an input mode in a manner that at least one inputted command selected from the group consisting of switching commands and adjusting commands causes a switching and adjusting, respectively, of said function at a given instant of time selected from the group consisting of immediately and only when the machine is in a given operating condition.

3. Device according to claim 1, including means for representing at least one of the machine as a whole and said components of the machine on said display device.

4. Device according to claim 3, wherein said display is controllable by said controls so that said display is effected in accordance with the type of control to be performed.

5. Device according to claim 1, including additional controls for triggering independently performed processes in the machine.

6. Device according to claim 1, including at least one control for representing a plurality of said components simultaneously.

7. Device according to claim 1, including at least one control for applying at least one command from the group consisting of switching and adjusting commands simultaneously, to a plurality of said components.

8. Device according to claim 1, wherein the machine is a printing machine having printing units individually selectable and controllable by said second group of controls.

9. Device according to claim 1, wherein said groups of controls are arranged on outer sides of a two-dimensional display so that said assignment of said controls to the components is visible on the display by means of a spatial assignment to the controls of graphic symbols represented on said display.

10. Device according to claim 1 centrally arranged in combination with a printing machine, and wherein at least one of the components of the printing machine, including a paper feed, a paper delivery and printing units, has at least one decentralized control and display device.

11. The combination according to claim 10, wherein given ones of the components are controlled by said decentralized control device and, in turn, act upon the centrally arranged device.

12. The combination according to claim 10 having a control desk for at least one of printing ink and printing register, and wherein inputs at said control desk are effective at the centrally arranged device.

13. The combination according to claim 10 having a control desk for at least one of printing ink and printing register, and wherein inputs at the centrally arranged device are effective at said control desk.

* * * * *